United States Patent [19]
Wolfson et al.

[11] 3,885,095
[45] May 20, 1975

[54] COMBINED HEAD-UP MULTISENSOR DISPLAY

[75] Inventors: Gerald Wolfson; Eric R. Fehr, both of Los Angeles, Calif.

[73] Assignee: Hughes Aircraft Company, Culver City, Calif.

[22] Filed: Apr. 30, 1973

[21] Appl. No.: 357,125

[52] U.S. Cl. ..................... 178/7.88; 178/DIG. 20
[51] Int. Cl. ............................................. H04n 7/18
[58] Field of Search .......... 178/DIG. 20, 7.85, 7.88, 178/7.89, 7.84, 7.5 SE; 350/174; 35/12 R, 12 B, 12 W, 12 N, 12 F

[56] References Cited
UNITED STATES PATENTS

| | | | |
|---|---|---|---|
| 2,186,570 | 1/1940 | Batchelor | 178/7.88 |
| 3,547,522 | 12/1970 | Schaeffer | 178/7.85 |
| 3,574,283 | 4/1971 | Albers | 350/174 |
| 3,654,386 | 4/1972 | Baum | 178/7.5 SE |
| 3,666,353 | 5/1972 | Sussman | 178/DIG. 20 |
| 3,697,154 | 10/1972 | Johnson | 178/DIG. 20 |
| 3,737,212 | 6/1973 | Antonson et al. | 350/174 |
| 3,738,733 | 6/1973 | Pettit | 350/174 |

FOREIGN PATENTS OR APPLICATIONS

| | | | |
|---|---|---|---|
| 892,227 | 3/1944 | France | 350/174 |
| 1,312,282 | 1/1962 | France | 350/174 |
| 175,792 | 6/1961 | Sweden | 350/174 |

Primary Examiner—Howard W. Britton
Assistant Examiner—Michael A. Masinick
Attorney, Agent, or Firm—W. H. MacAllister, Jr.; Walter J. Adam

[57] ABSTRACT

An aircraft cockpit display system which uses a single cathode ray tube or other image generating device to provide both a head-up display, in which a collimated pattern is superimposed on the pilot's field of view through the wind shield, and a multisensor display in which a radar picture or the like is viewed by looking down from the wind shield. The system includes a tube with a face positioned a small distance below the wind shield, a lower semi-reflecting mirror, a collimating lens above the lower mirror, and a combining mirror directly behind the wind shield. The aviator can look through the combining mirror and wind shield to see the collimated tube image superimposed on his field of view through the wind shield, or can look downwardly through the lower mirror to directly view the face of the tube.

10 Claims, 11 Drawing Figures

COMBINED HEAD-UP MULTISENSOR DISPLAY

The invention herein described was made in the course of or under a Contract or Subcontract thereunder with the Air Force.

BACKGROUND OF THE INVENTION

This invention relates to display systems for aircraft, and more particularly to head-up display systems which provide a collimated image superimposed on the aviator's field of view through the canopy or window of the aircraft.

Tactical aircraft can employ both a multisensor display (MSD) and a head-up display (HUD) to present data to the pilot. The MSD presents radar, infrared, and television data to the pilot in his normal head-down field of view wherein he looks down at the instrument panel. The HUD, which may be of a type shown in U.S. Pat. No. 3,532,413, presents symoblic data to the pilot that is required for weapon delivery, flight, take off, and landing, and presents this data in the form of a collimated image that is superimposed on a small region of the field of view through the wind shield or canopy. The two display systems can be installed with the HUD above the MSD so that both are directly in front of the pilot to facilitate movement of the pilot's vision from one to the other. The two display systems are valuable enough to be used even though they occupy considerable cockpit panel space as well as producing a penalty in weight, cost and electrical power. A display system which could provide both display modes but with a reduction of required cockpit panel space, weight, cost and power consumption, would have great utility in aircraft, particularly if such a system facilitated viewing of the displays.

SUMMARY OF THE INVENTION

In accordance with one embodiment of the present invention, an aircraft display system is provided that produces both a head-up display and a multisensor type of display, which occupies a minimum of cockpit panel space, which is of minimal weight and power consumption, and which provides a superior display. The system includes a single cathode ray tube (CRT) which is positioned on the cockpit front panel, a lower semi-reflecting mirror that reflects most of the CRT light upwardly, a collimating lens assembly above the lower mirror, and an upper semi-reflecting mirror above the collimating lens assembly and in the field of view of the pilot when he looks through the transparent canopy. The pilot can look through the lower mirror to directly view the face of the tube, or he can look forward through the upper mirror and through the canopy to see a target or landing field and to also see a symbolic display superimposed on the view.

Two major types of signal generating circuits are connected to the cathode ray tube, one of them generating signals representing a radar image or other detailed representation of the environment, and the other generating signals representing reference marks that symbolically or graphically indicate the position and orientation of the craft with respect to the earth or to a target or the like. The circuit which generates a radar display is connected to the tube most of the time. However, when the pilot must look through the canopy during critical maneuvers, as when firing at a target or landing the craft, he operates a switch to change to the head-up mode of operation. The switch connects the reference-generating circuit to the tube and opens a shutter that allows light from the tube to reach the upper mirror, so that the symbolic display appears in the pilot's field of view through the canopy. The use of a single cathode ray tube reduces the amount of panel space, weight, and power consumption of the system. In addition, the direct viewing display can be positioned closer to the top of the front panel, so that the pilot shifts his vision by a smaller angle when he shifts between the head-down and head-up position.

The novel features of the invention are set forth with particularity in the appended claims. The invention will best be understood from the following description when read in conjunction with the accompanying drawings.

DESCRIPTION OF THE PREFERRED EMBODIMENTS

Figure 1:
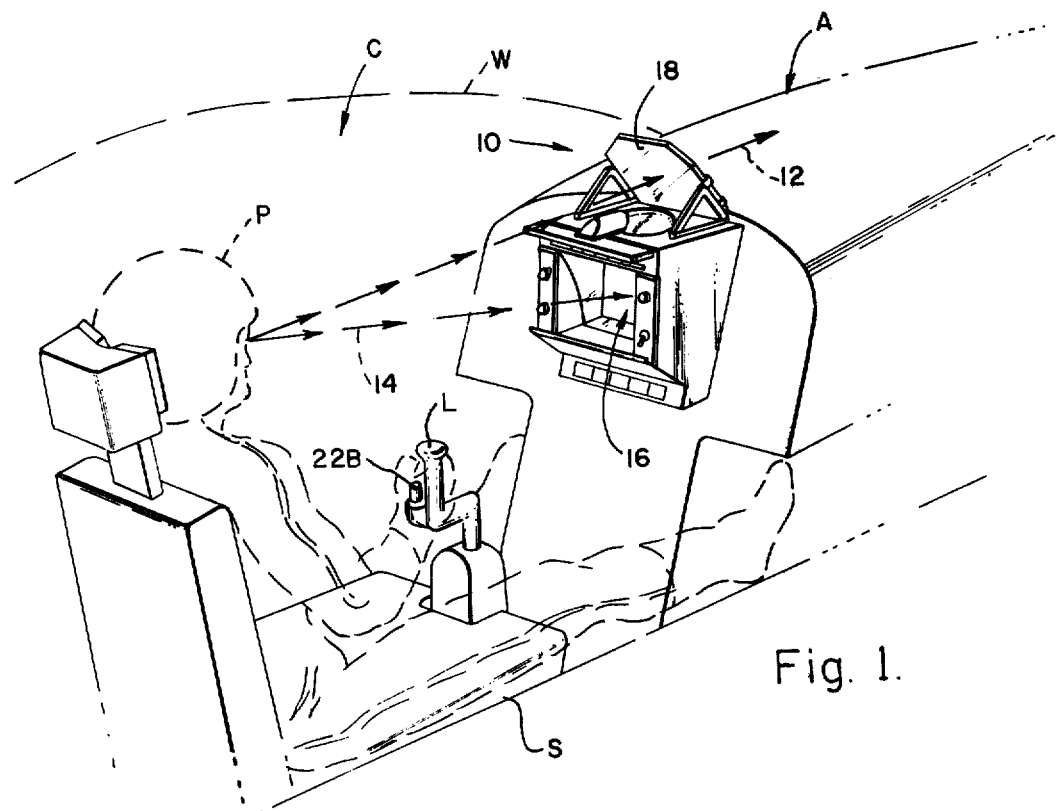
FIG. 1 is a partial perspective view of an aircraft, showing the display system of the invention therein.

FIG. 1 illustrates a display system 10 which is contained in the cockpit C of an aircraft A to present data to the aviator or pilot P. During critical maneuver periods, such as during weapon delivery, take off, and landing, the pilot is in a head-up position wherein he looks through the transparent wind shield W, and generally looks straight ahead in the direction of arrow 12. At other times, the pilot may occasionally look in a head-down direction as indicated by arrow 14 towards a picture display 16. The picture display 16 may be a radar display representing the ground and air environment at a considerably distance in front of the craft, or a light-amplified or infrared image of the environment near the craft, or other display.

In the head-up view along arrow 12, the pilot looks through a semi-reflecting combining mirror 18 of the system, where a symbolic reference display is produced which is collimated and superimposed on the field of view. Thus, for example, circles representing the aiming direction of weapons on the craft and symbols indicating the orientation of the craft may be superimposed on the field of view through the wind shield. In accordance with the present invention, a single image generating device such as a cathode ray tube 20 is utilized to provide both the picture display at 16 which the pilot views in the head-down position and the symbolic reference display which the pilot sees by way of the combining mirror 18 in the head-up position.

The pilot P sits in a seat S and manipulates a control lever L to fly the craft. A buttom 22B is provided on the control lever to enable a pilot to switch the display presented by the display system 10 from a radar or other display designed to be directly viewed in the head-down mode, to a symbolic reference display useful in a critical maneuver such as in weapon delivery and designed to be viewed in the head-up mode of operation.

Figure 2:
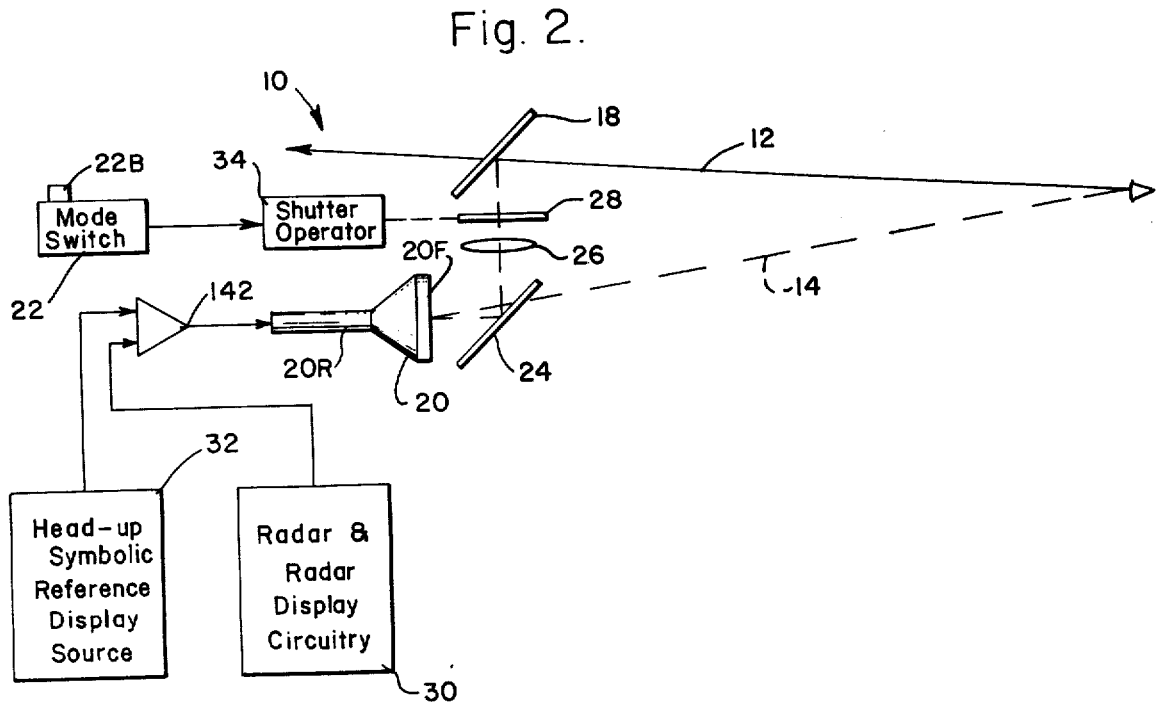
FIG. 2 is a simplified side elevation and block diagram view of the system of FIG. 1.

As illustrated in FIG. 2, the display system includes a lower semi-reflecting mirror 24 in front of the face 20F of the cathode ray tube (i.e., outside the tube) for reflecting some of the light from the tube face in an upward direction. A collimating lens assembly 26 positioned between the lower mirror 24 and the upper or combining mirror 18, collimates light from the tube face so that the image appears to originate at infinity. A shutter 28 is also positioned between the two mirrors to prevent the entrance of light onto the tube face 20F when the system is being used for the radar or head-down mode. The craft is provided with a radar and radar display circuitry 30 that is connectable through a mixing amplifier 142 to the cathode ray tube 20 to display a radar image on the tube. During the head-down mode of operation, the pilot can view the tube face 20F, which may carry a radar picture, by looking through the lower semi-reflecting mirror 24. However, when the pilot depresses the switch buttom 22B, he operates a mode switch 22 that controls the mixing amplifier 142 so that it connects only a head-up reference display source 32 to the tube 20, and does not connect the radar circuitry thereto. At times when the head-up display source 32 is connected to the tube, a signal is also provided to a shutter operator mechanism 34 which opens the shutter 28 so that light from the tube can pass up to the combining mirror 18.

Figure 3:
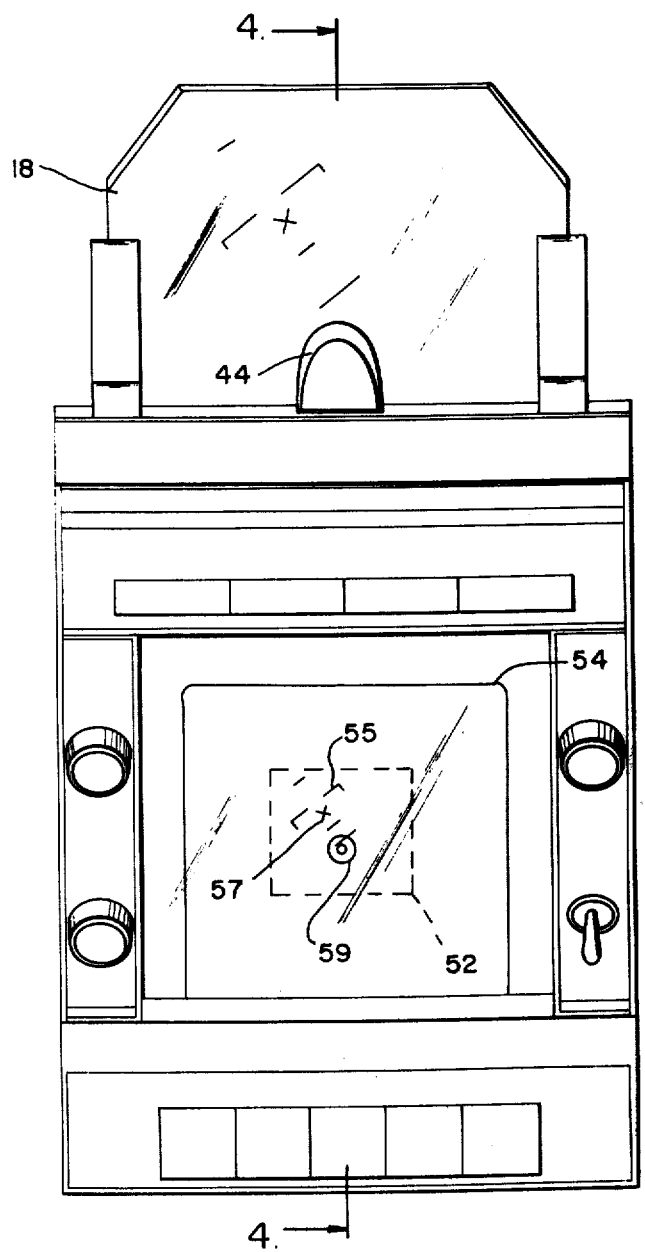
FIG. 3 is a view of the display system of FIG. 1, showing how it appears to the aviator.
Figure 4:
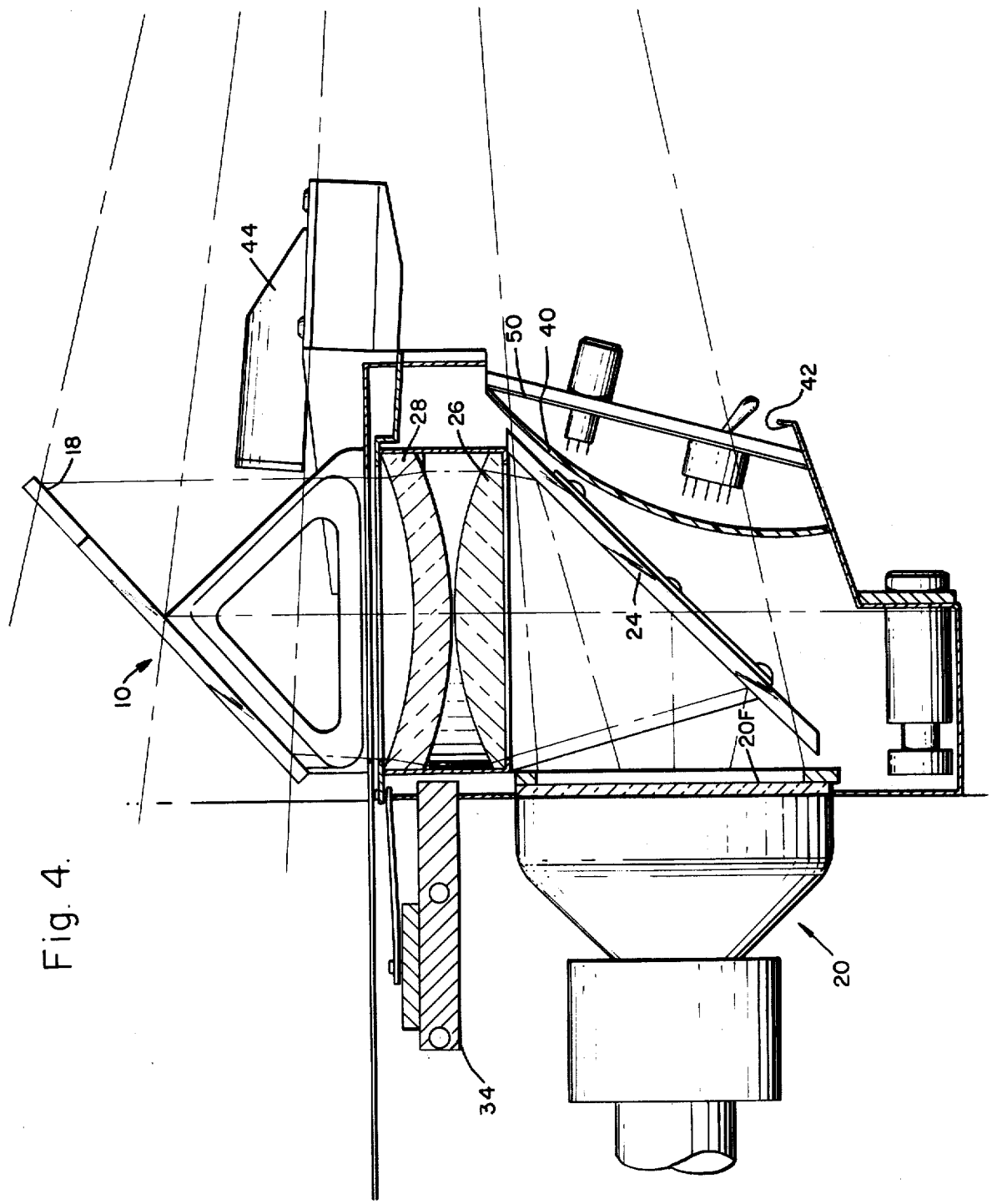
FIG. 4 is a sectional side view taken on the line 4—4 of FIG. 3.
Figure 5:
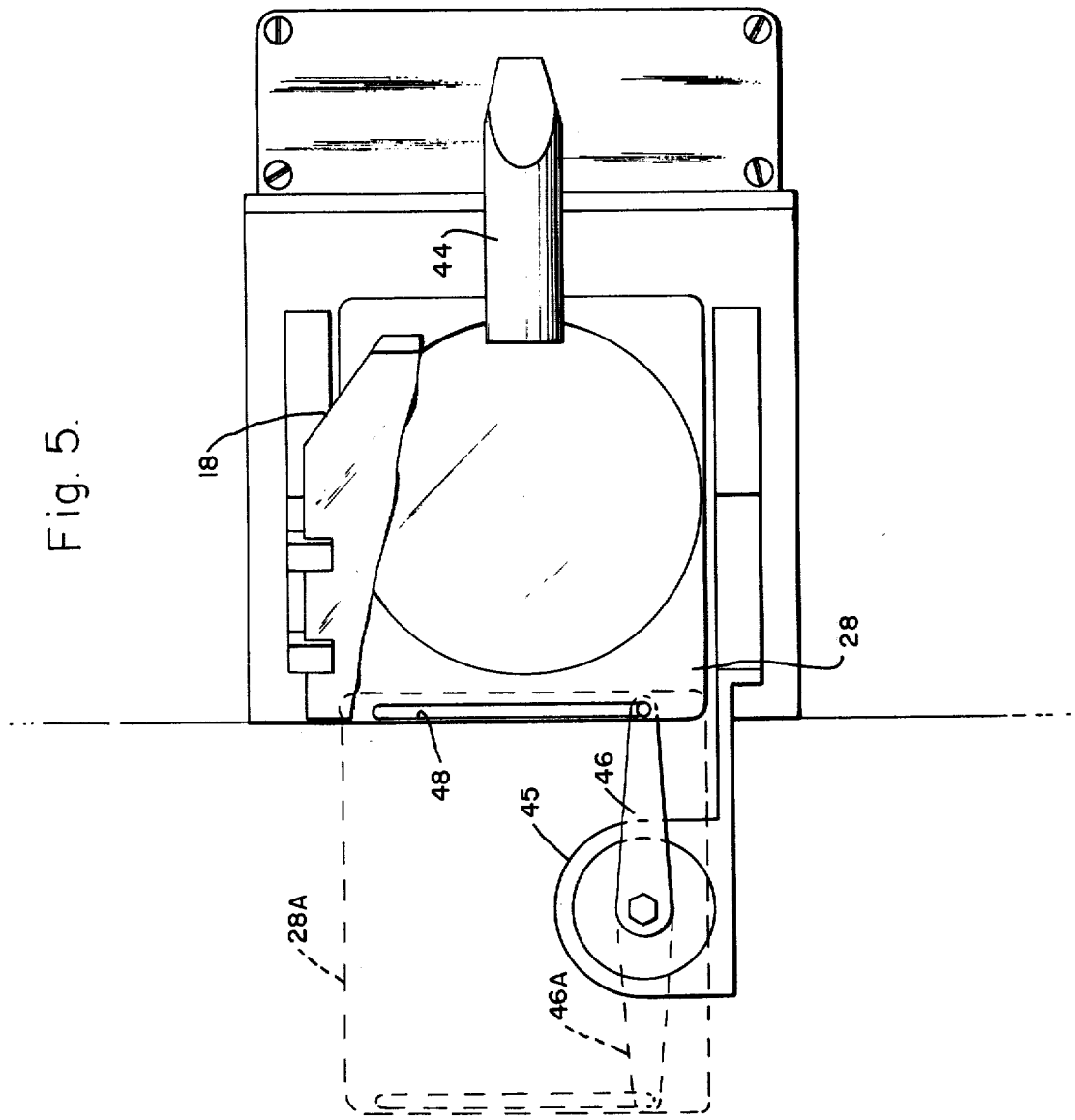
FIG. 5 is a plan view of the display system of FIG. 3, but with a portion of the cover thereof removed.

Referring also to FIGS. 3–5, it can be seen that the system includes additional elements that facilitate its use. A curved ambient light filter 40 (FIG. 4) directs some of the ambient light into a light trap region 42 to reduce ambient light reaching the tube face. A camera 44 is provided to record the view seen by the pilot through the combining mirror 18. The shutter mechanism 34 (FIG. 5) has a rotatable arm 46 with a pin at the end which is engaged with a slot 48 in the shutter 28. When a rotary solenoid 45 rotates the arm 46 to the position 46a, the shutter is drawn back to the position 28a wherein it uncovers the region below the combining mirrow 18 so that light from the tube face reaches the combining mirror. The shutter is normally left in the closed position until a head-up display is desired during weapon delivery, landing or take off. This is to minimize the amount of ambient light that could otherwise reach the face of the cathode ray tube and that could interfere with the direct viewing of the tube face along the head-down view line 14.

The lower mirror 24 is generally constructed to reflect a higher proportion of the light received from the tube face than it transmits. In one system, the lower mirror 24 reflects about 90 percent of the light from the tube face and transmits only about 10 percent. A high reflectivity is desirable because a very bright image is required along the head-up view line 12 since the head-up image may be superimposed in a bright field of view. The transmittal of only 10 percent of light from the tube is generally sufficient, because the housing 50 of the system serves as a hood to reduce ambient light and the filter 40 and light trap 42 further reduce the amount of light that can interfere with direct viewing.

The semi-reflecting mirror 24 also acts as a light filter that can improve direct viewing of the tube, because the mirror allows only about 10 percent of the ambient light to pass therethrough and fall on the tube face 20F. The main impediment to clear direct viewing of the tube face through the mirror 24 is often not the brightness of the image on the tube face, but the contrast between the image and ambient light that falls on the tube face. Although the lower mirror 24 reduces the amount of transmitted image-defining light to 10 percent of the intensity at the tube face, it reduces the intensity of ambient light to 1 percent of the original value since the ambient light must pass twice through the mirror. Thus, under high ambient light conditions the semi-reflecting mirror 24 actually can improve viewing. For the upper mirror 18 which serves as a combiner of the image on the tube face and the view of the environment, a transmission of about 70 percent of light and a reflectance of about 30 percent of light may be used.

The size of the image required on the tube face 20F is different for the head-up mode than for the head-down mode. In the head-down mode, a relatively large display is desirable which covers nearly the entire face of the tube, a typical tube face approximating a five inch by five inch square. In the head-up mode, a much smaller image is required to permit collimation with a minimum of distortion by the lens assembly 26 which is located relatively close to the tube face. Accordingly, the head-up reference display source 32 (FIG. 2) is constructed so that it generates a pattern within boundaries 52 (FIG. 3) that define an area which occupies less than half the tube face. The head-up source 32, or a circuit operated whenever the system is utilized in the head-up mode, may be constructed to apply deflection voltages to the deflection coils of the tube 20 within a smaller voltage range than for the head-down mode, so that a smaller raster is created. The radar circuitry 30, or a circuit operated whenever the system is utilized in the head-down mode, can provide a wider voltage range to develop a larger raster that covers the entire tube face within the boundaries 54.

When a radar picture is generated in the head-down mode, a picture with many intensity levels in addition to zero intensity may be utilized, such as a total of eight different intensity levels. In the head-up display, only one intensity, which is the brightest intensity available, is utilized in addition to zero intensity, because only one intensity level is generally sufficient to provide symbolic reference data and because lesser intensities might be "washed out" by ambient light. A typical symbolic reference display may be of the type illustrated in FIG. 3 within the boundaries 52, wherein lines 55 are provided which are tilted to indicate the angle of roll of the aircraft, the aircraft being indicated by the symbol 57, and which indicate the horizon and the angle of pitch with respect to the horizontal. Also, bullseye circles 59 are provided to indicate the precise aiming direction of the craft. It should be understood that in the head-down mode, symbolic characters also may sometimes be displayed on the screen within boundaries that surround the entire screen; however, the display in the head-down mode is often a picture representing a radar or other image of the environment, while there seldom would be any need for that type of a display in the head-up mode of operation.

Figure 2A:
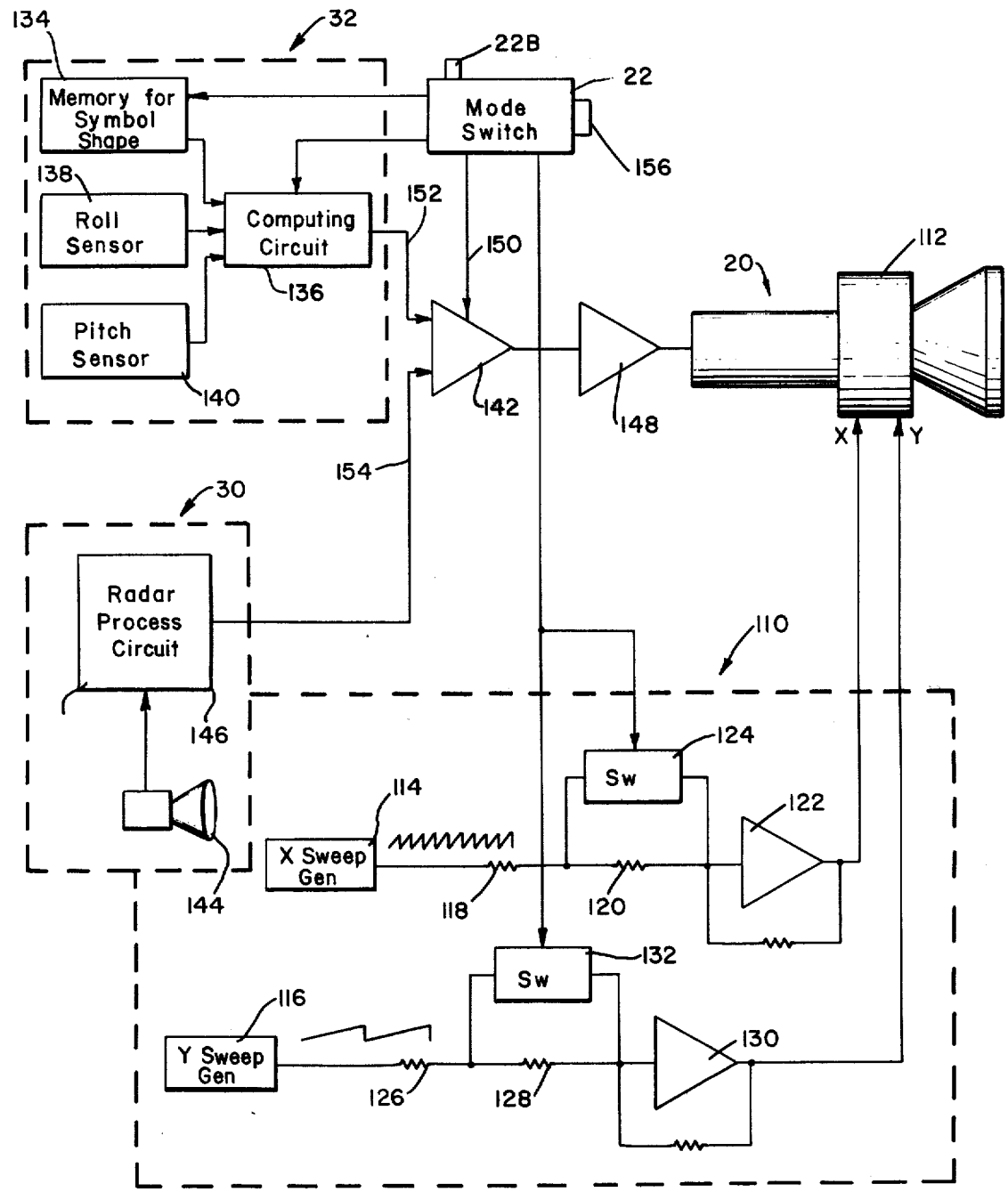
FIG. 2A is a more detailed block diagram of the system of FIG. 2.

FIG. 2A illustrates details of the circuit which generates either a head-down display that covers most of the tube face, or a head-up display which lies within boundaries that surround less than half of the area of the tube face. The size of the display is controlled by a sweep circuit 110 that is connected to the X and Y coils 112 of the cathode ray tube 20. The sweep circuit includes an X sweep generator 114 that generates a repetitive ramp voltage that controls horizontal sweep, and a Y sweep generator 116 that generates a slower repetitive ramp voltage that controls vertical sweep. The output of the X generator 114 passes through two resistors 118 and 120 to an operational amplifier 122 that is connected to the X coil of the tube coils 112. When the output of the X generator 114 must pass through both resistors 118, 120, the amplifier 122 generates an output that varies within a small voltage range so that the horizontal sweep extends across less than the full width of the tube face. A relay or switching circuit 124 is connected across one of the resistors 120. When the switching circuit 124 is closed, it effectively short circuits resistor 120 so that a sweep signal of large amplitude is delivered through the amplifier 122 to the X coil of the tube coils 112, and therefore the electron beam of the tube is swept across nearly the entire width of the tube face. In a similar manner, a pair of resistors 126, 128 connect the Y generator 116 to an operational amplifier 130 whose output drives the Y coil of the tube coils 112. Also, another switching circuit 132 can be closed to effectively remove the resistor 128 so that the Y coil is driven to sweep the beam of the tube across nearly the entire height of the tube face instead of a small portion thereof. Both of the switching circuits 124, 132 are controlled by the mode switch 22.

The symbolic display source 32 includes a solid-state read-only memory 134 which is programmed with the symbols that are to be displayed. The memory 134 is connected to a computing circuit 136 which also receives signals from a roll sensor 138 and pitch sensor 140 that sense the roll and pitch of the aircraft. The computing circuit 136 generates signals representing the symbols to be displayed, with the symbols altered in orientation and relative position in accordance with the signals from the roll and pitch sensors. The output of the computing circuit 136 is connected to an input 152 of a mixing amplifier 142. The mixing amplifier has another input 154 that can receive radar picture signals from the radar and radar display circuitry 30. The radar circuitry 30 includes a radar antenna 144 and a radar signal processing circuit 146 that processes the signals and delivers them to the mixing amplifier. The output of the mixing amplifier 142 is delivered through a video amplifier 148 to the grid of the cathode ray tube 20. Additional circuitry (not shown) is utilized to synchronize the sweep generator 110 with the circuits that generate the signals delivered to the grid of the tube. The symbolic display source 32 may be any conventional type such as described and explained in U.S. Pat. No. 3,449,721, Graphical Display System, issued June 10, 1969, to M. L. Dertouzos et al. The system of the Dertouzos et al patent includes a command program generator 10 operating in real time in response to input data to generate symbols with the data for particular symbols stored in units 12–16. The command program generator 10 which may include the memory 134 and the computing circuit 136, responds to input data to generate a symbol of a desired size, position and angle of rotation as may be required by the roll and pitch sensor inputs from the units 138 and 140. The command program in the referenced patent may be generated from a software program translator in accordance with the description therein to generate the initial and final coordinate positions of each curve portion, the curvature of the curve portion and initial and final slope information that may be required for generating a symbol of a particular scale, position and angle of rotation. Programs of this type to generate these parameters are well known in the art.

The mode switch 22 is connected to a control input 150 of the mixing amplifier 142 to determine whether signals from the first input 152 and/or the second input 154 are to be delivered to the cathode ray tube 20. When the display system is operated in the head-down mode, radar picture signals at the mixing amplifier input 154 may be delivered to the tube. A control 156 on the mode switching circuit 22 is provided which enables the aviator to choose whether only the radar signals will be delivered to the tube, or symbolic reference signals of the circuit 32 will be delivered to the tube, or whether both radar and symbol signals from the circuits 30, 32 will be delivered at the same time to the tube. The mixing amplifier 142 permits signals from the two inputs 152, 154 to be mixed so that the symbolic display and radar display can be presented as superimposed images at the face of the cathode ray tube. The control 156 also permits the aviator to choose which of several symbolic displays stored in the memory 134 will be delivered. Also, where infrared sensors or light intensifying devices are provided on the craft in addition to radar, the mode switch can be constructed to permit the aviator to choose which of these systems, that display a detailed picture of the environment, will be connected to the cathode ray tube.

The control apparatus 156 is normally mounted on the instrument panel for manipulation by the aviator when he is not in a critical maneuver situation. However, when the aviator must perform a critical maneuver, he merely depresses the button 22B that is located on the control lever L that steers the aircraft, and the mode switch 22 then automatically selects a predetermined reference display from the memory 134, automatically controls the mixing amplifier 142 to display only the symbolic reference picture from the source 32, automatically operates the switches 124, 132 at the sweep circuit so that the raster on the tube face covers only a small area of the face, and automatically opens the shutter 28.

Figure 6:
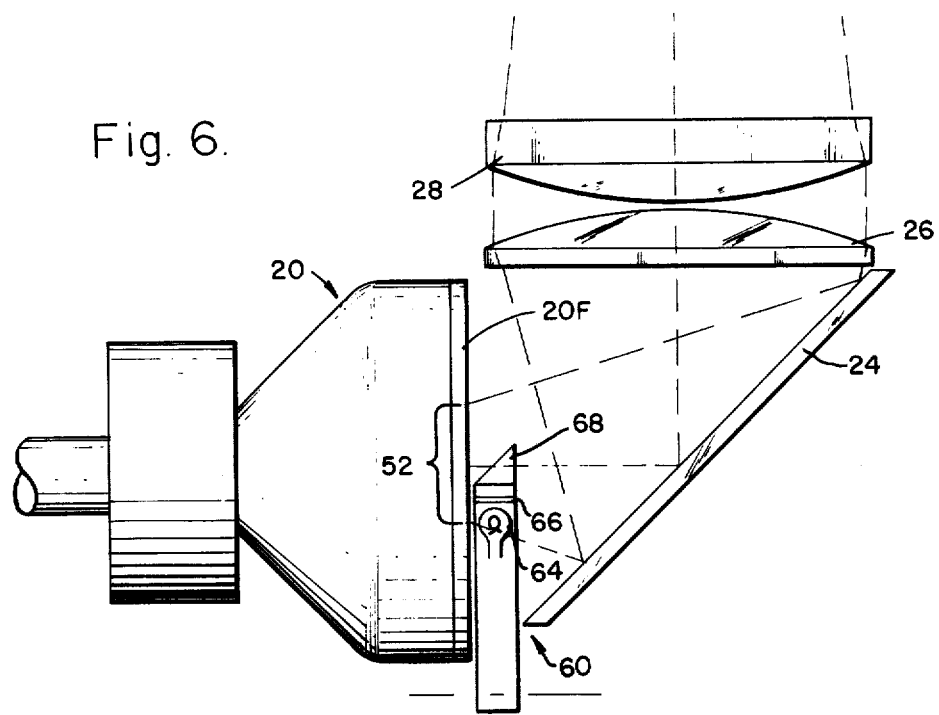
FIG. 6 is a partial sectional side view of a display system constructed in accordance with another embodiment of the invention, wherein an alternate reticle is utilized.
Figure 7:
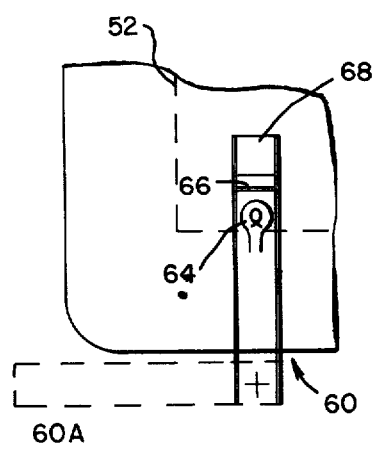
FIG. 7 is a partial front elevation view of the system of FIG. 6.

The use of the head-up display as a reference during critical maneuvers of the craft makes it important to provide at least a minimal backup display in case the cathode ray tube is not operating. FIGS. 6 and 7 illustrate a backup reticle assembly 60 which can be provided for such emergencies. The assembly 60 can be pivoted from the stowage position indicated at 60a, to the use position illustrated in solid lines, if the cathode ray tube does not operate. The reticle assembly includes a lamp 64 that illuminates a reticle 66, and a prism 68 or other mirror means for directing light from the reticle as though it came from a desired location on the tube face within the boundaries 52.

Figure 7A:
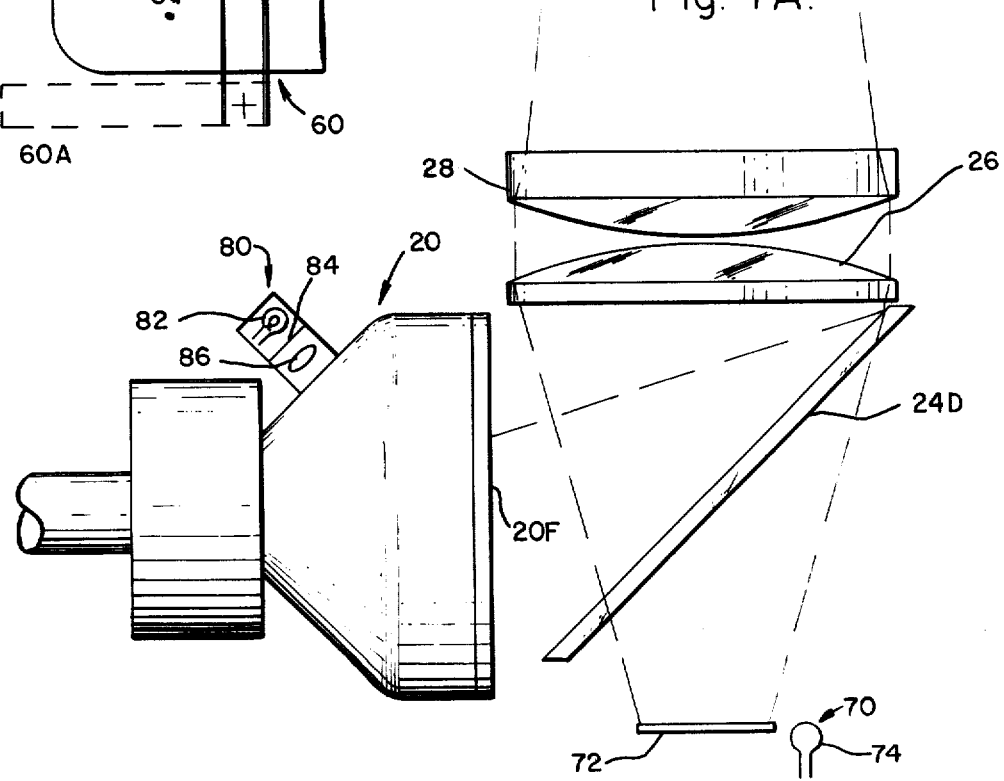
FIG. 7A is a partial sectional side view of a display system constructed in accordance with another embodiment of the invention, which employs another backup reticle arrangement.

FIG. 7A illustrates another backup reticle arrangement 70 which utilizes a backup reticle 72 positioned below a dichroic semi-reflecting mirror 24D. The reticle 72 is at the same distance from the collimating lens assembly 26 as the tube face 20F, so that the pattern on the reticle 72 is collimated by the lens assembly 26. If the tube 20 or the head-up display source for the tube malfunctions, the pilot can operate a switch (not shown) that energizes an illuminating lamp 74 for the backup reticle 72 so that at least a minimum reference display is presented for the head-up view.

In order to maximize the brightness of the image of the backup reticle 72 at the upper semi-reflecting mirror, the semi-reflecting mirror 24D is of a dichroic type. Otherwise, a very bright light source 74 would be required, since only about 10 percent of the light from the backup reticle would be transmitted through the lower mirror 24D, and because the reticle is smaller than the illuminated area of the combining mirror 18. For a typical cathode ray tube 20 of the type utilized in multisensor displays, the light from the tube is primarily in a narrow wavelength band that provides a green hue. Accordingly, the dichroic mirror 24D is constructed to reflect about 90 percent of the green light and transmit only about 10 percent of the green light, but is constructed to transmit a much greater portion of a different color such as red. The lamp 74 is constructed to generate a high proportion of light of a red hue so that a high proprotion of the backup reticle illumination is transmitted through the mirror 24D. A common incandescent lamp can be utilized at 74, since it generates a high porportion of light of a red hue which can pass through the dichroic mirror 24D. The red color is generally acceptable for the head-up display except where the field of view includes a region near a setting sun where considerable red ambient light is present. Of course, a variety of combinations of dichroic mirror constructions and reticle illuminations can be utilized to obtain the required color of display and brightness utilizing an easily accommodated illumination source for the reticle.

Still another backup reticle assembly is indicated at 80 in FIG. 7A, and includes a lamp 82, reticle 84, and lens 86 which form a reticle image on the face 20F of the tube 20 by projecting an image through a port located at the rear of the cathode ray tube.

Figure 8:
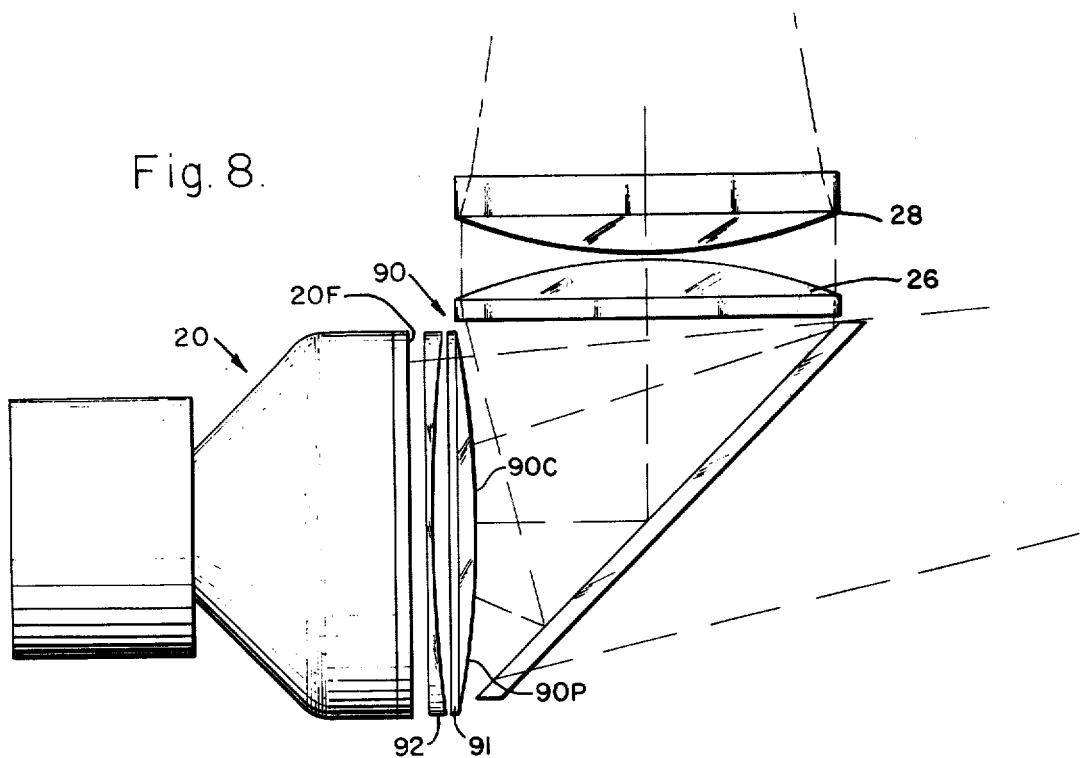
FIG. 8 is a partial sectional side view of a display system constructed in accordance with still another embodiment of the invention, wherein a field flattening lens assembly is provided.

The symbolic reference display must be presented with high precision where it includes a bullseye symbol or the like which the pilot aligns with a target (such as an enemy aircraft or a landing strip marker), and this precision must be maintained even though the pilot moves his head slightly away from a nominal position. Greater precision can be obtained by utilizing a field flattening lens assembly such as that shown at 90 in FIG. 8, which is positioned immediately in front of the face 20F of the cathode ray tube. The flattening lens assembly 90 is necessary only for the head-up display mode wherein the image on the tube face is collimated, and is not necessary for the head-down mode. However, where the lens assembly is to remain stationary, it must be large enough to cover nearly the entire tube face so that it does not interfere with direct viewing of the entire screen in the head-down mode.

In accordance with the present invention, the field flattening lens assembly 90 is constructed so that it is aspheric, with the center portion 90c being spherical and the outer portions 90p being progressively flatter. Where a pair of lenses 91, 92 are utilized, this construction can be described in reference to the focal length of the lens assembly, the net effect of the two lenses being to provide a substantially constant focal length along the center portion 90c and a progressively larger focal length at locations progressively nearer the edge of the portions 90p. One preferred construction utilizes a plano-convex lens 91 whose convex surface is a paraboloid, and a plano-concave lens 92 whose concave surface is a generalized aspheric. The combination of a cathode ray tube drive circuit wherein the head-up display covers a small area of the tube face, and an aspheric field flattening lens assembly, results in important advantages. One advantage is that high precision is attained for the head-up display mode, because of the spherical portion 90c of the flattening lens assembly which covers the tube face portion being utilized for that mode, and yet a minimum of distortion occurs in the direct viewing mode of operation because the lens assembly becomes progressively flatter near the edges of the tube face where large distortions would otherwise occur. Also, the size and weight of the field flattening lens assembly is reduced and it can be located closer to the tube face, as compared to a uniformly spherical lens that had to cover the entire tube face.

Figure 9:
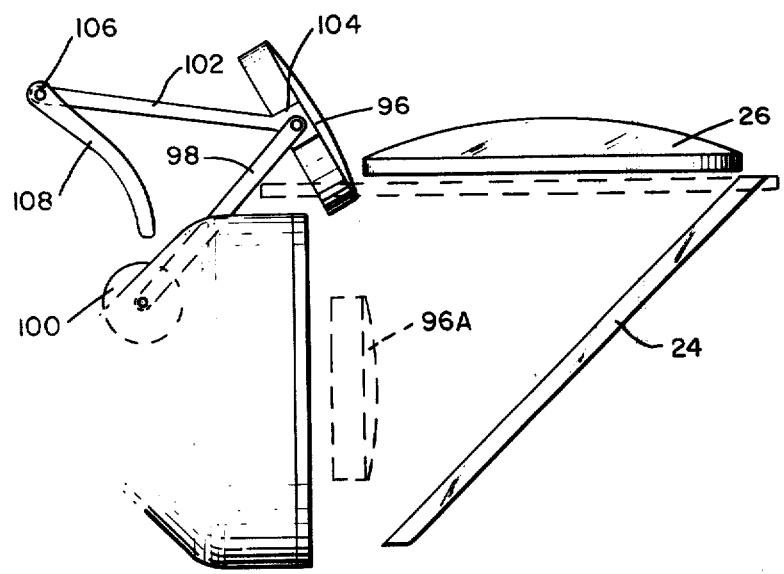
FIG. 9 is a partial sectional side view of yet another embodiment of the invention, wherein a moveable field flattening lens assembly is provided.

FIG. 9 illustrates an alternative flattening lens arrangement, wherein a spherical flattening lens assembly 96 is utilized which is movable into and out of a position in front of the tube face. The moveable field flattening lens assembly 96 occupies the position indicated in solid lines during the head-down display mode, but is moved to the position 96a to cover part of the tube face in the head-up mode. The lens assembly 96 is mounted at one end of a bar 98 whose other end is connected to the shaft of a rotary solenoid 100 which moves the lens assembly between its two positions. In addition, an orienting bar 102 is provided with an outer end 104 fixed to the lens assembly and an inner end 106 which slides along a guide 108. The orienting bar 102 controls the orientation of the lens assembly so that in its use portion 96a it lies parallel to the face of the tube, and so that as it is moved to its stowage position it can pass between the collimating lens assembly 26 and the tube face 20F.

Thus, the invention provides a combined head-down and head-up display system of minimum size, weight and cost which minimizes the amount of front panel space that is to be occupied, and which brings the head-down display close to the head-up display so that there is a minimum distance between the two displays. This is accomplished by utilizing a single apparatus for creating a display image, such as one cathode ray tube, and by constructing the system so that the image can be viewed in both the head-up and head-down viewing directions. It should be noted that a variety of image-forming devices such as an array of light-emitting diodes, can be utilized. A lower mirror such as mirror 24 which is stationary and semi-reflecting can be employed to reflect light upwardly for the head-up display and to allow the image to be directly viewed for the head-down display. While a moveable lower mirror could be used, a stationary semi-reflecting mirror has the advantage of eliminating a moveable element that could reduce reliability. Where a cathode ray tube is employed to generate an image, it is generally desirable to orient the tube face in a primarily horizontal direction for direct viewing in the head-down mode. In such a tube orientation, the rear 20R of the tube extends behind the instrument panel instead of along it, so that the rear tube portion occupies a minimum of instrument panel space. The different image sizes required on the tube face for the head-down and head-up modes are provided by generating a different size of raster for the two modes, the display in the head-down position covering nearly the entire tube face and the display in the head-up mode covering less than half the area of the tube face. The collimation of the image and the combination of the collimated image with the view through the wind shield can be performed by a collimating lens and a flat semi-reflecting mirror. However, other means also can be utilized, such as a concave semi-reflecting combining mirror, which can both collimate the image and combine it with the view through the wind shield.

Although particular embodiments of the invention have been described and illustrated herein, it is recognized that modifications and variations may readily occur to those skilled in the art, and consequently it is intended that the claims be interpreted to cover such modifications and variations.

What is claimed is:

1. A display system for an aircraft that has a wind shield area where an aviator can see the environment and a panel area below the wind shield area, comprising:
   a display device having a face on which images are formed;
   first means for displaying the image on the face of the display device at a head down viewing region which is located at the panel area, so the aviator can view the image by looking thereat;
   second means for displaying at the wind shield area in a head up viewing region a collimated image of the image on the face of the display device, said second means displaying said image superimposed with the view of the environment that could be seen through said wind shield area if it were unobstructed;
   signal generating means operable in a first mode to generate signals that create a display within first boundaries that surround a large portion of the area of the face of the display device, and operable in a second mode to generate signals that create a display within second boundaries that surround an area smaller than the area surrounded by said first boundaries; and
   switch means for selectively operating said signal generating means in the first or second mode.

2. The display device described in claim 1 including:
   field flattening lens means positioned in front of the face of said display device for increasing the precision of the display in the windshield area from within said second boundaries, said lens means having a substantially constant focal length in a first region which covers the area of the display device within said second boundaries for displaying in the head up viewing region, and said lens means having a larger focal length at a position outside said first region for displaying in said head down viewing region.

3. The display device described in claim 1 wherein:
   said second means includes a semi-reflecting mirror positioned in front of the face of the display device for reflecting some of the light from the face in an upward direction and transmitting some of the light from the face of the display device for direct viewing by the aviator; and
   a shutter disposed above said semi-reflecting mirror to prevent downwardly travelling light rays from reaching the tube face when it is being directly viewed.

4. The display system described in claim 1 wherein:
   said display device generates a display which has a maximum intensity of light of a first predetermined wavelength;
   said first means includes a dichroic semireflecting mirror which reflects a high percentage but transmits a low percentage of light of said first predetermined wavelength, but which transmits a greater percentage of light of a second wavelength; and including
   a backup reticle assembly positioned so that light therefrom can pass through the dichroic mirror to said second means which displays a collimated image, said reticle assembly illuminated with light that has a higher intensity at said second wavelength than at said first wavelength so that a high proportion of reticle light can pass through the mirror.

5. A display system for an aircraft comprising:
   a display device having a face on which images are formed;
   first mirror means in front of said face, said first mirror means for reflecting light from the face of the display device and for transmitting light;
   second semi-reflecting mirror means positioned above the first mirror means mounted in the field of view of an aviator in the aircraft for displaying an external scene of view and the images from said display device; and
   collimating means positioned between said first and second mirror means for collimating light from the face of the display device so that the collimated image on the face of the display device is reflected from the second mirror means toward the aviator;
   the face of said display device positioned to be viewable through said first mirror means, so that the aviator can see the uncollimated image on the face of the display device by looking downwardly from the position of the second mirror means.

6. The display system described in claim 5 including:
   a shutter between said first and second mirror means; and wherein
   said display device is oriented with its face in a primarily vertical plane, so that it occupies a minimum of panel area; and
   said first mirror means reflects light from the face in an upward direction, said first mirror means being selected to reflect most of the light incident thereon and transmit less than half of said light and to have filter characteristics to minimize the entrance of ambient light onto the face of the tube that would reduce the contrast.

7. The display system described in claim 5 wherein:
the face of said display device is oriented in a primarily vertical plane for direct viewing through the first mirror, and said first mirror is semi-reflecting; and including
a backup reticle positioned below the first mirror means and spaced from the collimating means by a distance equal to the spacing along the optical path of the face of the display device from the collimating means.

8. The display system described in claim 5 wherein:
the face of said display device is positioned in a primarily vertical plane for direct viewing through the first mirror means, and said display device generates a display which has a maximum intensity of light of a first predetermined wavelength;
said first mirror is selected to be a dichroic mirror which transmits a low percentage of light of said first predetermined wavelength, but which transmits a greater percentage of light of a second wavelength; and including
a backup reticle assembly positioned below the first mirror so that some light from the backup reticle can pass through the first mirror into the collimating lens means, said reticle assembly including illuminating means to provide light that has a higher intensity at said second wavelength than at said first wavelength so that a high proportion of reticle light can pass through the first mirror.

9. The display device described in claim 5 including:
a shutter disposed between said first and second mirror means;
signal generating means coupled to said display device for controlling said display device to operate in a first mode to create a display within first boundaries that surround a large portion of the area of the display device face, and to operate in a second mode to create a display within second boundaries that surround an area smaller than the area surrounded by said first boundaries; and
switch means for selectively operating said signal generating means in said first or second modes and respectively closing or opening the shutter.

10. The display device described in claim 9 including:
field flattening lens means positioned in front of the face of said display device for providing a substantially constant focal length in a first region which covers the area of the display device face within said second boundaries, and for providing a progressively larger focal length at locations progressively further outside said first region.

* * * * *